United States Patent
Kim et al.

(10) Patent No.: US 8,259,338 B2
(45) Date of Patent: Sep. 4, 2012

(54) IMAGE FORMING APPARATUS AND METHOD OF FILE CONVERSION

(75) Inventors: Jae-ho Kim, Suwon-si (KR); Hyuck Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1221 days.

(21) Appl. No.: 11/221,757

(22) Filed: Sep. 9, 2005

(65) Prior Publication Data

US 2006/0061792 A1 Mar. 23, 2006

(30) Foreign Application Priority Data

Sep. 21, 2004 (KR) .................. 10-2004-0075392
Dec. 14, 2004 (KR) .................. 10-2004-0105631

(51) Int. Cl.
*G06K 15/00* (2006.01)
*G06F 3/12* (2006.01)
(52) U.S. Cl. .............. 358/1.16; 358/1.13; 358/1.15
(58) Field of Classification Search ............ 358/1.13, 358/1.15, 1.16
See application file for complete search history.

(56) References Cited

U.S. PATENT DOCUMENTS

| 6,816,277 B2 * | 11/2004 | Kaltenecker et al. | 358/1.15 |
| 2003/0179400 A1 * | 9/2003 | Kofman et al. | 358/1.13 |
| 2003/0184803 A1 * | 10/2003 | Yamada et al. | 358/1.16 |
| 2004/0190045 A1 * | 9/2004 | Matsuhara et al. | 358/1.15 |
| 2004/0227968 A1 * | 11/2004 | Nakamura et al. | 358/1.13 |
| 2004/0252315 A1 * | 12/2004 | Kang | 358/1.8 |

FOREIGN PATENT DOCUMENTS

| JP | 2000-224365 | 8/2000 |
| JP | 2000-284926 | 10/2000 |
| JP | 2003-244380 | 8/2003 |
| JP | 2004-288174 | 10/2004 |
| KR | 10-181137 | 4/1998 |
| KR | 2001-27256 A | 4/2001 |
| KR | 2003-81950 A | 10/2003 |
| KR | 2004-63666 | 7/2004 |

OTHER PUBLICATIONS

Chinese Office Action dated Oct. 20, 2006 issued in CN 200510109751.8.
KR Office Action dated Feb. 27, 2006 issued in KR 2004-75392.
KR Office Action dated Mar. 30, 3006 issued in KR 2004-105631.

* cited by examiner

*Primary Examiner* — Benny Q Tieu
*Assistant Examiner* — Sunil Chacko
(74) *Attorney, Agent, or Firm* — Stanzione & Kim, LLP

(57) ABSTRACT

An image forming apparatus having a file-format conversion function and a method thereof. The image forming apparatus is capable of performing a data communication with an external memory device. The image forming apparatus includes an interface unit to receive a first file from the external memory device and to transmit a second file to the external memory device, and a file converter to convert a format of the first file from a first format into a second format according to information on the first and second files. Thus, the format of the received file can be converted in the image forming apparatus in a simple and speed way.

31 Claims, 6 Drawing Sheets

IMAGE FORMING APPARATUS AND METHOD OF FILE CONVERSION

CROSS-REFERENCE TO RELATED APPLICATIONS

This application claims benefits under 35 U.S.C. §119 (e) from Korean Patent Applications Nos. 2004-75392 filed on Sep. 21, 2004 and 2004-105631 filed on Dec. 14, 2004 in the Korean Intellectual Property Office, the entire content of which are incorporated herein by reference.

BACKGROUND OF THE INVENTION

1. Field of the Invention

The present general inventive concept relates to an image forming apparatus having a file-format conversion function and a method thereof. More specifically, the present general inventive concept relates to an image forming apparatus and method, in which a format of a received data file can be converted, and the converted data file can be printed or transmitted to and stored in an external memory device.

2. Description of the Related Art

In general, an image forming apparatus, such as a printer or a replicator, performs a data communication with an information processing device, such as a computer, through a serial or parallel line to receive printing data and print the received print data on a print paper.

In the information processing device, a user loads an application program to generate a data file containing a text and an image or to generate the printing data, which is then transmitted to the image forming apparatus and printed on the print paper.

When generating or storing an original file using the application program, the user generates and saves the data file in a text file format, or designates an image file format, such as BMP, PDF, or TIFF, to generate and save the data file in the designated image file format.

In order to print the generated file, if a print command is input to the application program, a printer driver processes the data file, which is stored in the text file format or the image file format, into the printing data recognizable in the image forming apparatus, using a language such as PCL (printer control language) or PS (post script). Then, the generated printing data is transmitted to the image forming apparatus.

Therefore, if the image forming apparatus receives the printing data transmitted from the information-processing device, the image forming apparatus generates a display list with respect to the received printing data. The printing data is converted into a bitmap file of two-bit data using the generated display list and then printed on the print paper after various image-processing steps for printing.

On the other hand, a current trend for development is that the image forming apparatus, such as the printer or the replicator, is connected to an external memory device, such as a USB memory stick, using a USB connection terminal such that the image forming apparatus can receive data stored in the external memory device to print the received data, or to transmit data to the external memory stick to store therein.

The USB connection terminal is one of the serial buses, which has been developed for easy connection between the information processing device, such as the computer, and peripheral devices. Using this USB connection terminal, the peripheral devices, such as a printer, a modem, a scanner, a digital camera, or a camcorder, can be connected to the information processing device to be used immediately when the information processing device is turned on.

Thus, in a case where a USB memory device, such as the USB memory stick having the USB connection terminal, is connected to the image forming apparatus through the USB connection terminal provided therein when it remains turned-on, the USB memory device is immediately added on the information processing device to thereby enable a data communication therebetween.

However, if a format of data files received from the information processing device or the USB memory device is not a format supportable in the image forming apparatus, the received data file cannot be printed in the image forming apparatus.

Furthermore, in addition to the printing job of a data file stored in the USB memory device, the image forming apparatus is required to convert the format of the data file and to store the converted format file in the USB memory device.

As the number of Internet users increases, and a number of users continue to operate web pages as a home page, image files are widely used for the users to edit the web pages, and the users generate and edit the image files to use the edited image files as the web pages.

The image files have various formats such as JPEG, TIFF, PPDF, or the like. Depending on a web service provider, an image file format used in the web pages may be different in many cases. Thus, in order for a user to upload the user's own materials to the web page, the user is required to convert a text file into an image file, or to convert an image file into other image format files.

However, since a format of an image file is the same as an original format of the image file, a text file needs to be converted into another imager file, or the format of the image file needs to be converted into other formats when a target format of the image file is different from the original format. Therefore, there are disadvantages in that many different format conversion programs are needed, depending upon the original format and the target format.

SUMMARY OF THE INVENTION

The present general inventive concept provides an image forming apparatus and method to convert a format of a received data file, to print the converted data file, and to transmit and store the converted data file in an external memory device.

Additional aspects and advantages of the present general inventive concept will be set forth in part in the description which follows and, in part, will be obvious from the description, or may be learned by practice of the general inventive concept.

The foregoing and/or other aspects of the general inventive concept may be achieved by providing an image forming apparatus having a file-format conversion function and being capable of performing a data communication with an external memory device, the image forming apparatus comprising an interface unit to receive a first file from and to transmit a second file to the external memory device, and a file converter to convert a format of the first file from a first format into a second format to form the second file.

The file converter may include at least one coding section to perform encoding and decoding operations to convert the file format according to information on the first and second formats. In addition, the file converter may selectively operate the at least one coding section, depending upon the first format and the second format.

The information may include a file name list for files stored in the external memory device.

The image forming apparatus may further comprise a panel operation unit to display the file name list of the files and to input a format conversion command for one of the files corresponding to the first file. If a file name of the file and the second format are input through the panel operation unit, the file converter converts the file format of the file corresponding to the file name into the second format.

The interface unit transmits the format-converted file to the external memory device. The external memory device may include one of a USB memory device having a USB connection terminal and a memory card.

The first format and the second format may be one of a BMP (bitmap) image format, a TIFF (tag image file format), and a PDF (portable document format).

The external memory device may include a plurality of memory devices, and the interface unit may receive the first file from or transmit the second file to the plurality of external memory devices. The file converter may convert the format of the first file transmitted from one of the plurality of external memory devices, and the interface unit may transmit the format-converted file (second file) to one of the plurality of external memory devices.

The foregoing and/or other aspects of the general inventive concept may also be achieved by providing a method of converting a file format in an image forming apparatus, which can perform a data communication with an external memory device, the method comprising receiving files stored in the external memory device and information on the files, selecting one of the files whose format is to be converted, and converting a format of the selected file from a first format into a second format.

The converting of the format of the selected file may include performing an encoding and decoding operation to convert the format of the selected file according to the information.

The information may include a file name list for the files stored in the external memory device.

The method may further comprise displaying the file name list of the files, designating a file name corresponding to the one of the files from the file name list, and inputting a format conversion command for the designated file.

The inputting of the format conversion command may comprise designating the second format. In addition, the method may further comprise transmitting the file converted into the second format to the external memory device.

The external memory device may include a plurality of external memory devices, and the receiving of the files and information may include receiving the file and the information on the files from one of the plurality of external memory devices.

The transmitting of the file may include transmitting the file converted into the second format to one of the plurality of external memory devices. In addition, the method may include printing the file converted into the second format onto a print paper.

The method may further comprise selecting the transmitting operation or the printing operation.

The foregoing and/or other aspects of the general inventive concept may also be achieved by providing an image forming apparatus having a file-format conversion function, the image forming apparatus comprising an interface to receive printing data and printing information on the printing data from an information processing device, a graphic processor to generate an image file of at least one format designated using the printing data according to the printing information, and a controller to analyze the printing information to confirm the designated format of the image file, and to control the graphic processor to generate the image file according to the designated format.

The graphic processor may include a bitmap generator to generate bitmap data for printing, using the printing data, and a cording section to perform encoding of the bitmap according to the format to generate the image file.

The printing information may include information on whether the image file is to be generated for the printing data, information on the format, or information on whether the generated image file is to be transmitted to the information processing device.

The foregoing and/or other aspects of the present general inventive concept may be achieved by providing a method of converting a file format in an image forming apparatus, the method comprising receiving printing data and printing information on the printing data from an information processing device, generating bitmap data using the printing data, and analyzing the printing information to confirm whether a file format of the printing data is to be converted, and the format into which the printing data is converted, and generating an image file using the bitmap data according to the format.

The method may further comprise transmitting and storing the image file generated by the information processing device, according to the printing information.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
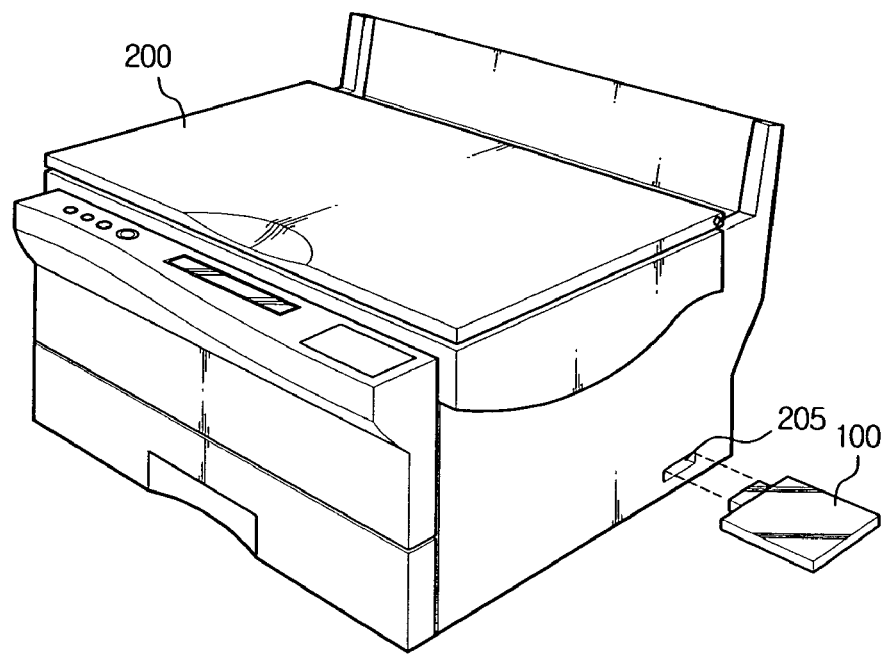
FIG. 1A is a view illustrating an exemplary environment of an image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1A is a view illustrating an exemplary environment of an image forming apparatus 200 according to an embodiment of the present general inventive concept.

As shown in FIG. 1A, the image forming apparatus 200 is connected with an external memory device 100 through a connection terminal 205 so as to communicate therewith. Thus, first data stored in the external memory device 100 can be transmitted to the image forming apparatus 200 and printed in the image forming apparatus 200 after a data format of the first data is converted into a second data format to form second data. In addition, the second data can be transmitted from the image forming apparatus 200 to the external memory device 100, in which the second data is stored. Hereinafter, the external memory device 100 will be illustrated as a USB memory device, but not limited thereto. The external memory device 100 includes, for example, various interfaces, such as IEEE 1394, to connect the external memory device 100 and the image forming apparatus 200.

Figure 1B:
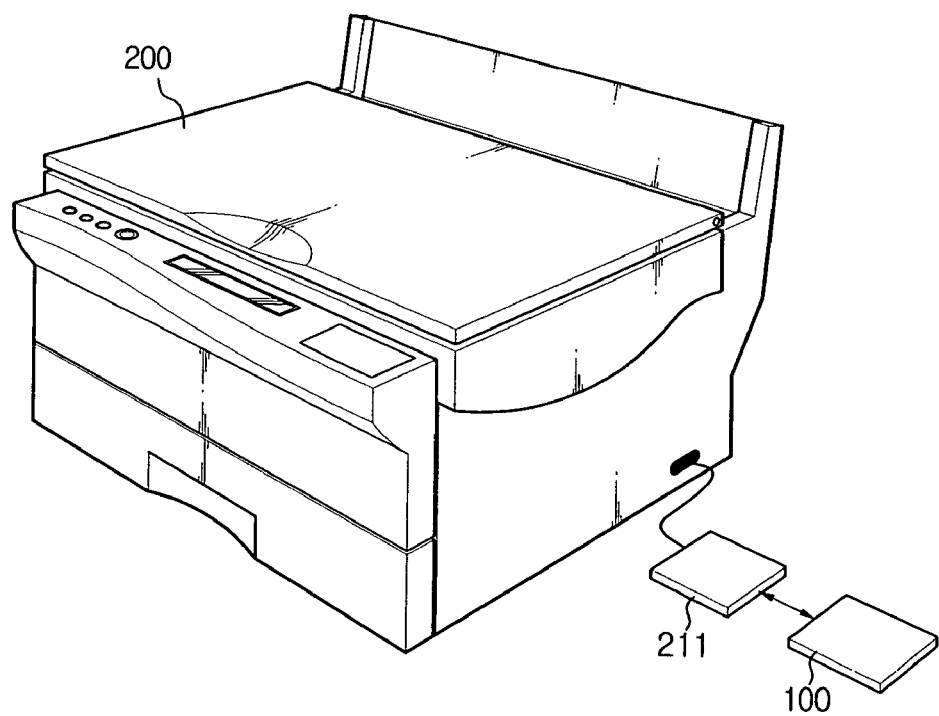
FIG. 1B is a view illustrating another exemplary environment of an image forming apparatus having a page edit function according to an embodiment of the general inventive concept.

FIG. 1B is a view illustrating another exemplary environment of an image forming apparatus 200 having a page edit function according to an embodiment of the general inventive concept.

Referring to FIG. 1B, the image forming apparatus 200 is connected to the memory device 100 through a read-out card device 211. The memory device 100 includes a CF type I (compact flash), a CF type II (Microdrive), an SMC (smart media card), an MMC (multimedia card), an SD (secure digital memory card), an MS (memory stick), or the like. The read-out card device 211 supports the memory device 100 and interfaces between the image forming apparatus 200 and the memory device 100. Here, the read-out card device 211 is illustrated as an external type card device. However, the read-out card device 211 may be internally mounted in the image forming apparatus 200 and may function to read out data from the memory device 100 connected thereto. Hereinafter, the internal type card device will be explained as an example of the read-out card device 211.

Figure 2:
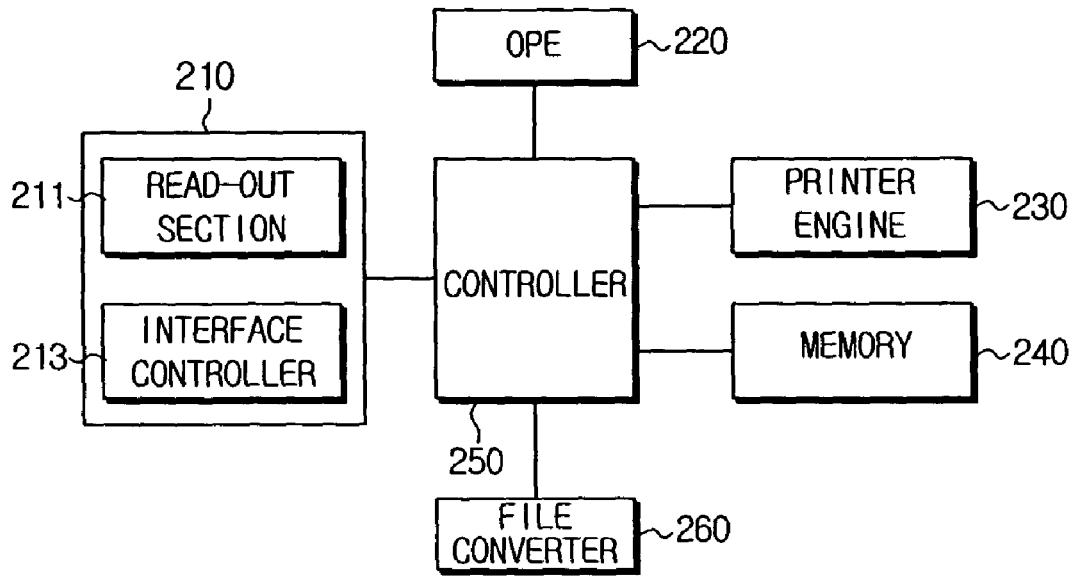
FIG. 2 is a block diagram illustrating an image forming apparatus having a file-format converting function according to an embodiment of the general inventive concept.

FIG. 2 is a block diagram illustrating an image forming apparatus 200 having a file-format converting function according to an embodiment of the general inventive concept.

The image forming apparatus 200 having the file-format converting function includes an interface unit 210, a panel operation unit (OPE) 220, a printer engine 230, a memory 240, a controller 250 and a file converter 260. FIG. 2 illustrates function blocks related to the file-format converting function of the image forming apparatus 200, and other function blocks are omitted for the convenience of description.

The interface unit 210 interfaces between the controller 250 and an information processing device, such as a computer or the memory device 100 as an external memory device, so as to receive data from the information processing device or the memory device 100, or transmit data to the memory device 100 or the information processing device from the image forming apparatus 200.

The interface unit 210 includes a read-out section 211 to read data from the memory device 100 and an interface controller 213 to manage data communication with the memory device 100, which is connected thereto through a connection terminal, for example, the connection terminal 205 of FIG. 1A. The interface controller 213 senses the memory device 100 when the data is received through the connection terminal provided in the image forming apparatus 200. Then, the interface unit 210 performs the data communication with the detected external memory device 100.

The panel operation unit (OPE) 220 is provided with an input device (not shown) having a plurality of number keys and function keys. A control signal generated through user's key operation of the input device is applied to the controller 250. In addition, the panel operation unit (OPE) 220 is provided with an LCD (not shown) to display an operation state of the image forming apparatus 200.

The printer engine 230 functions to print data stored in the memory 240 according to a print command, which is input to the controller 250, or to print the data transmitted from the information processing device or the memory device 100.

The memory 240 includes a non-volatile memory to store various control programs to operate the image forming apparatus 200 having the file-format converting function, and a volatile memory to store data generated during an operation of the image forming apparatus 200 and detailed information on the stored data. For example, the volatile memory temporarily stores printing data received from the information processing device through the interface unit 210, the data received from the memory device 100, and the data processed through the file-format converting function.

The controller 250 controls the image forming apparatus 200 according to a drive program stored in the memory 240. The controller 250 checks an image file to be converted and a format thereof, and controls the file converter 260 to convert the image file into a file of a designated format (target format).

Figure 3:
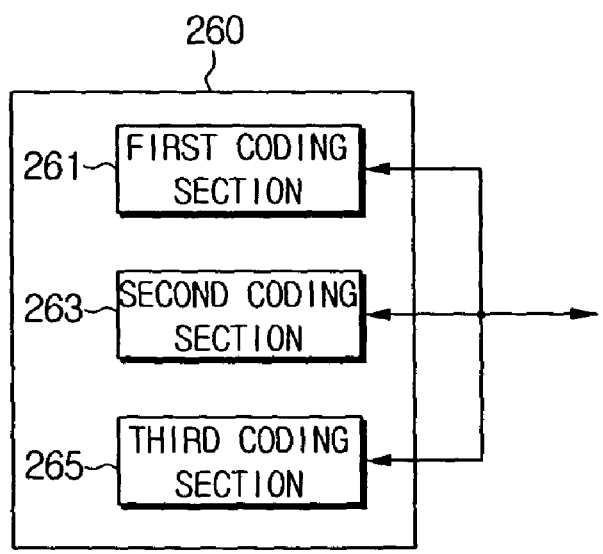
FIG. 3 is a block diagram illustrating a file converter of the image forming apparatus of FIG. 2.
Figure 4:
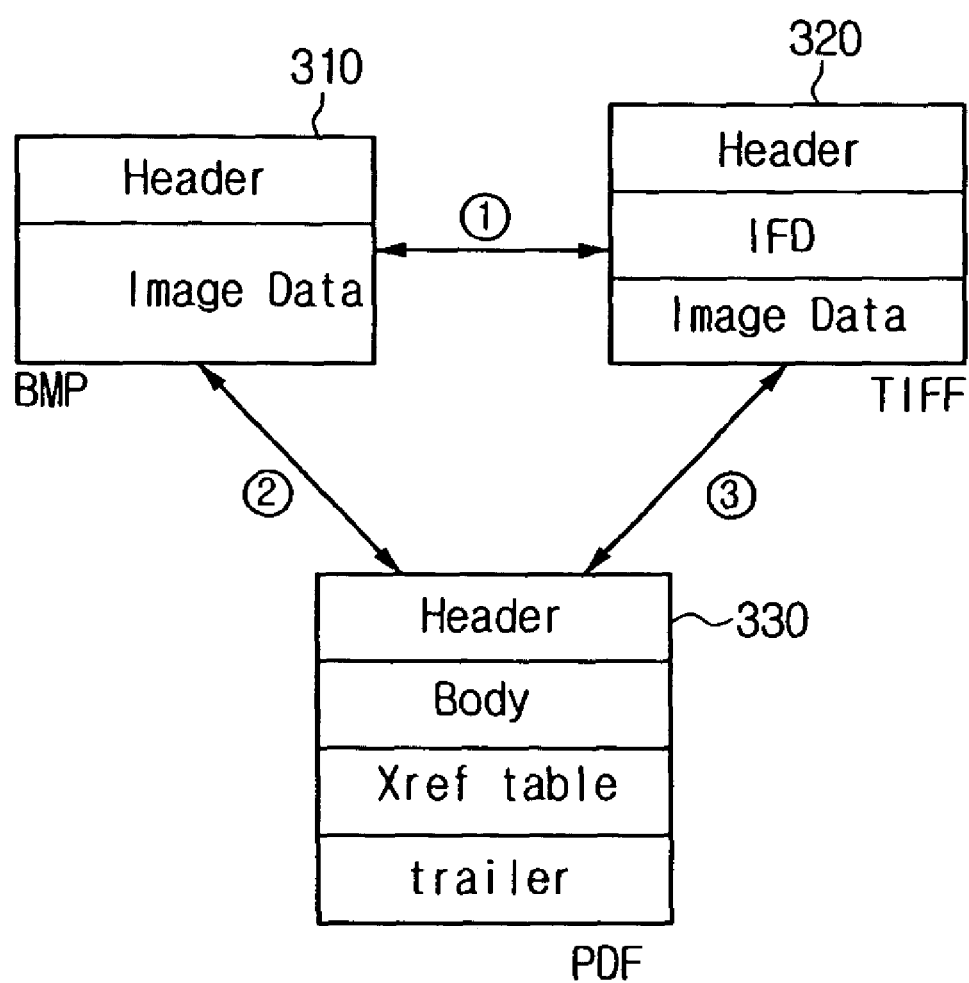
FIG. 4 is a schematic diagram illustrating an operation of the file converter of FIG. 2.

FIG. 3 is a block diagram illustrating the file converter 260 of the image forming apparatus 200 of FIG. 2. FIG. 4 is a schematic diagram illustrating an operation of the file converter in FIG. 2.

An image file format indicates a type of a file, which includes an image. The file converter 260 can reduce or expand an image capacity thereof, b converting a format of the file, i.e., the image file format according to a compression and storage mode. The image file format may be BMP (bitmap) format, TIFF (tag image file format), PDF (portable document format), or the like. The above file formats are generated according to a format specified in each specification of the file, based on a raw file generated by a bitmap mode, and identified by its compression mode and a header of the file.

In the bitmap mode, the image on a screen is read and expressed in a unit of a bit. That is, the image of the screen are expressed with bits of '0' and '1' and its combinations indicate information on the bits forming the image, which is similar to an arrangement of dots constituting the image.

The bitmap (BMP) format may be formed of a header section of four bytes and an image data section. The header section includes four bits to represent start and end positions of the image on two axes of a two-dimensional plane. The image data section is composed of '0' and '1' in a case of a black and white image, where a presence of a dot is expressed by '1' and an absence of the dot is expressed by '0'. Thus, 16×16 data can be expressed with 256 bits. In addition, a color image has a value corresponding to four bit planes and thus requires four times of a memory space of black and white data.

The BMP format is an image file format of a bitmap system, which is a standard being used in the Microsoft Windows environment and stores an image in a DIB (device independent bitmap) format without compression. As shown in FIG. 4, a BMP format 310 includes a header section and an image data section. The header section represents a type of a BMP file, a size of the BMP file, a starting position of image data, a size of the header section, a size of an image (pixel unit), the number of bits per pixel, compression information, a size of bitmap (byte unit), a horizontal resolution, a vertical resolution, and the like.

Since there are problems in changing image file formats, Adobe System, Inc., and Microsoft Corporation have jointly developed the TIFF, which has flexibility, expandability, independability, and correctability, and can provide image information in a form of a tag.

As shown in FIG. 4, a TIFF file 320 is formed of an image file header (IFH), an image file directory (IFD), and an image data section including TIFF data as image data. The TIFF retains the image data of a bitmap mode, and may use a compression technology, such as LZW (Lempel Ziv Welch), in order to reduce a data volume. In the TIFF file, the image file header includes first 8 bytes of the TIFF file, but a position of the image file directory (IFD) and the image data section is not fixed.

On the other hand, the PDF is a file format for document preparation used in Acrobat of Adobe System, Inc. The PDF file is generated from raw data of the bitmap system using a compression technology such as LZW, JPEG (joint photographic exerts group), or the like. It has been widely used due to its small size of a file volume and various functions.

As illustrated in FIG. 4, a PDF file 330 includes a header section, a body section, a cross-reference (Xref) table, and a trailer. The body section includes data for all objects, such as font, image, bookmark, and the like. The header section represents a type of the PDF file 330, and the trailer includes a point for the Xref table and a pointer for a key object contained in the body section. In addition, the Xref table includes a pointer for all the objects contained in the PDF file.

Referring back to FIG. 3, the file converter 260 may include a first coding section 261, a second coding section 263, and a third coding section 265 to convert the format of a received data file according to the control of the controller 250.

The first coding section 261 performs an operation 1 of FIG. 4, i.e., converts the BMP format file 310 into the TIFF file 320 and vice versa. That is, in a case where the format of the data file to be converted is the BMP format and desired to be converted into the TIFF, or in a case where the format of the data file to be converted is the TIFF and desired to be converted into the BMP file, the controller 250 controls the first coding section 161 to parse and analyze the received data file, and perform data encoding or decoding.

As described above, the BMP format file 310 is a bitmap file, which is not compressible. In order to convert the BMP format file 310 into the TIFF file 320, the first coding section 261 separates bitmap data of the image data section from the BMP file 310 according to the information recorded in the header section thereof, and encodes the separated bitmap data to generate the TIFF file 320. That is, the header and IFD are created according to the encoded data, and the created header and IFD are added to the encoded data to thereby form the TIFF file 320. In order to convert the TIFF file 320 into the BMP format file 310, the first coding section 261 parses the TIFF file to thereby decode the image data according to the information contained in the IFH and IFD, and generates raw data of the bitmap system to form the BMP format file 310. The header is created according to the raw data of the bitmap system, and the created header is added to the raw data to thereby form the BMP format file 310.

The second coding section 263 performs an operation 2 of FIG. 4, i.e., converts the BMP format file 310 into the PDF file 330 and vice versa. The controller 250 controls the second coding section 163 to parse the received file to analyze information on the file format and perform data encoding or decoding according to the analyzed information.

In order to convert BMP format file 310 into the PDF file 330, the second coding section 263 separates bitmap data of the image data section from the BMP format file 310 according to the information recorded in the header section thereof, and encodes the separated bitmap data to generate the PDF file 330. That is, the header, Xref table, and trailer are created according to the encoded data, and the created header, Xref table, and trailer are combined with the encoded data to thereby form the PDF file 330. Further, in order to convert the PDF file 330 into the BMP format file 310, the second coding section 263 parses the PDF file 330 to thereby decode the data contained in the body according to the information contained in the header section, the Xref table and the trailer thereof, and generates raw data of the bitmap system to form the BMP file 310. That is, the header is created according to the raw data, and the created header is combined with the raw data to thereby form the BMP format file 310.

Furthermore, the third coding section 265 performs an operation 3 of FIG. 4, i.e., converts the TIFF file 320 into the PDF file 330 and vice versa. According to the control of the controller 250, the third coding section 165 parses the received file to analyze information on the file format and performs data encoding or decoding accordingly.

In order to convert the TIFF file 330 into the PDF file 320, the third coding section 265 separates image data of the image data section from the TIFF file 320 according to the information recorded in the header section thereof, decodes the separated image data to generate bitmap raw data, and encodes the generated bitmap raw data to generate the PDF file 330. That is, the header, Xref table, and trailer are created according to the encoded data, and the created header, Xref table, and trailer are combined with the encoded data to thereby form the PDF file 330. In addition, in order to convert the PDF file into the TIFF file, the third coding section 265 parses the PDF file to thereby decode the data contained in the body according to the information contained in the header section, the Xref table and the trailer thereof, generates bitmap raw data of the bitmap system, and encodes the bitmap raw data to form the TIFF file 320. That is, the header and the IFD are created according to the encoded data, and the created header and IFD are combined with the encoded data to thereby form the TIFF file 320.

Figure 5:
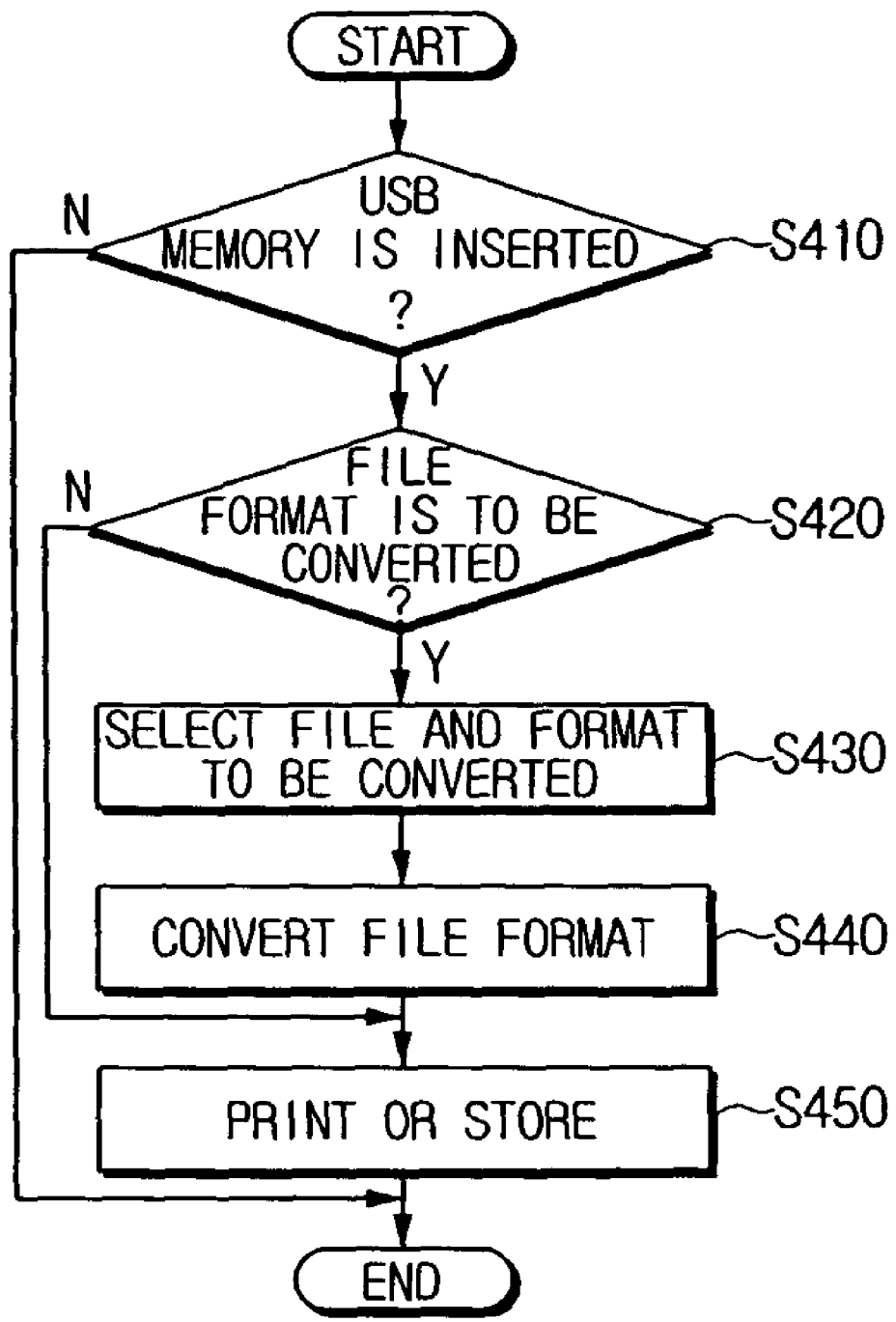
FIG. 5 is a flow chart illustrating a file-format converting operation of the image forming apparatus of FIG. 2.

FIG. 5 is a flow chart illustrating the file-format converting operation of the image forming apparatus 200 of FIG. 2.

Referring to FIGS. 1A through 5, if a user inserts the memory device 100 into the connection terminal 205 to connect the memory device 100 to the image forming apparatus 200 (S410), the interface controller 260 senses the memory device 100 and performs the data communication with the detected memory device 100.

When the interface controller 260 detects the memory device 100, it receives file information including a file list stored in the memory device 100 and transmits the received file information to the controller 250. Therefore, the controller 250 controls the panel operation unit 220 to display the file list, so that the user can check the file list to thereby input a command, such as a selective print of each file, a file conversion, a print of a converted file, a storage of the converted file to the memory device 100, etc. In general, a file name expressed in the file list contains an extension (for example, .bmp, .pdf, or the like) indicating a format type of an image file.

If a user inputs through the panel operation unit 220 a print command or a file-format conversion command for one or more files stored in the memory device 100, the controller 250 determines whether the file-format conversion command is inputted (S420). In a case where the file-format conversion command is inputted, the controller 250 controls the panel operation unit 220 to display the file list, so that the user can select at least one of the files to be converted and a format into which the selected file is converted.

On the other hand, the controller 250 can confirms the file format for each file name contained in the file list. Thus, if the file list contains a file format not supported by the image forming apparatus 200, the controller 250 may control the panel operation unit 220 to ask the user whether the file format conversion operation for the file is to be performed.

If the user selects the file to be converted and the format into which the selected file is converted (S430), the controller 250 controls the file converter 260 to convert the selected file into the selected file format (S440). Depending upon the format, the file converter 260 selects one of the first to third coding sections 261 to 265 to perform the file conversion operation.

In addition, when the format conversion operation for the selected file is completed, the converted file may be printed or transmitted to and stored in the memory device 100, depending on the user's command (S450).

As described above, the image forming apparatus 200 is configured to perform the data communication with a single external memory device 100 to thereby receive the file, convert the format of the received file, and then print the converted file or send the converted file back to the memory device 100. However, a plurality of memory devices 100 can be employed. In this case, the image forming apparatus 200 may be provided with a connection terminal 205 capable of connecting the plurality of memory devices 110 thereto so as to perform the data communication simultaneously with the plurality of memory devices 100 through the interface unit 210. In addition, the image forming apparatus 200 may receive a file from one of the plurality of memory devices 100 through the interface unit 210 and convert the format of the received file. Then, the converted file may be transmitted to and stored in the one of the plurality of memory devices 100 or the other one of the plurality of memory devices 100.

As described above, according to this embodiment of the general inventive concept, when the data transmitted from the information processing device or the external memory device 100 has a format not supported by the printer, the file is converted into a printable format and printed.

In addition, the format of a data file, which is transmitted from an external memory device, can be converted, and the converted file can be re-transmitted to the external memory device and stored therein. Thus, the file conversion can be performed in a simple and speedy manner.

Hereafter, another embodiment of the general inventive concept will be explained in detail, referring to FIGS. 6 to 8.

Figure 6:
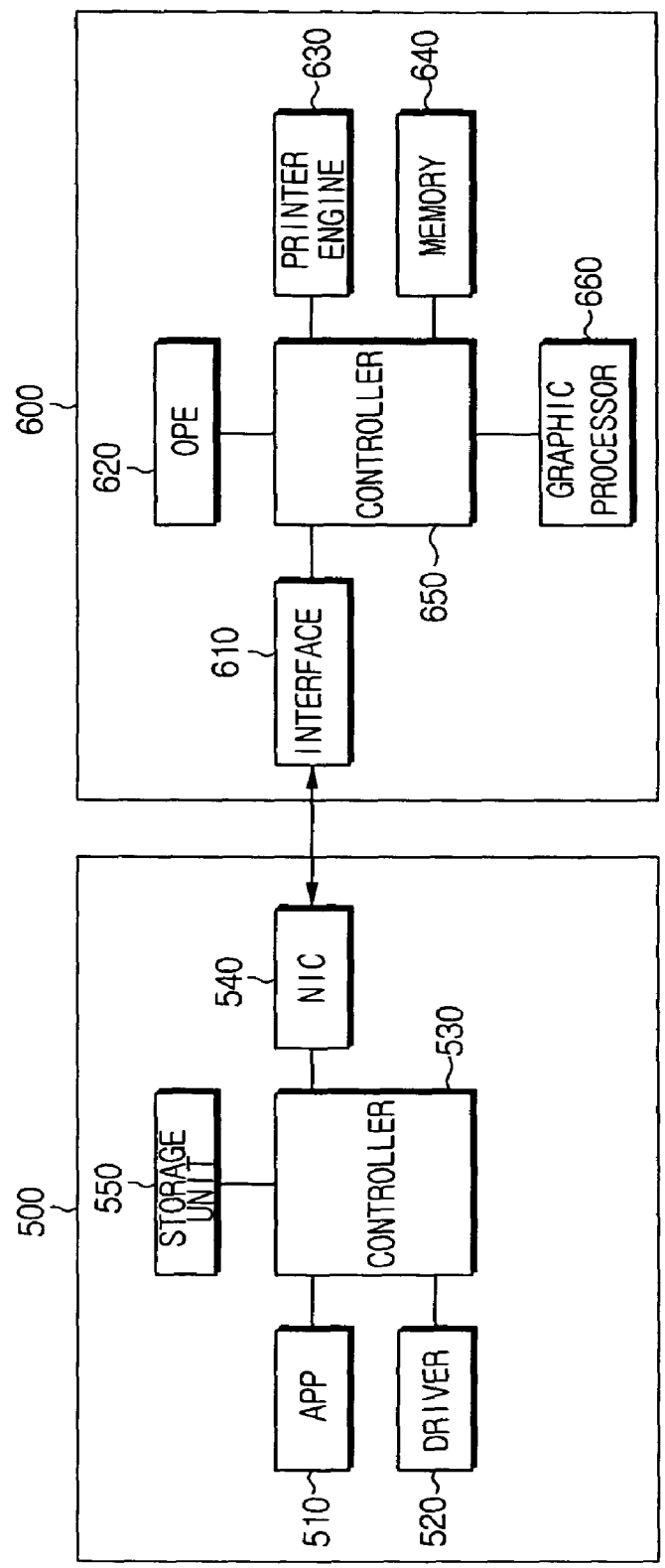
FIG. 6 is a block diagram illustrating an image forming apparatus having a data file conversion function and a host device according to an embodiment of the general inventive concept.

FIG. 6 is a block diagram shown an image forming apparatus 600 having a data file conversion function and an image processing device 500 as a host device according to another embodiment of the general inventive concept.

As illustrated in FIG. 6, the image forming apparatus 600 is connected to an external device, such as the information processing device 500, through a network, and data generated or stored in the information processing device 500 is converted into printing data and transmitted to the image forming apparatus 600.

Therefore, the image forming apparatus 600 is configured such that the received printing data is processed to print, and converted into an image file having a designated format (target format) and then transferred to the information processing device 500, or transmitted to other external memory device (not shown) to store the converted file therein.

Referring to FIG. 6, the information processing device 500 includes an application program unit (APP) 510, a driver 520, a controller 530, a network interface card (NIC) 540, and a storage unit 550.

The application program unit 510 may include a documentor, such as a word processor of Microsoft Corporation or Hangul of HABSOFT Inc., or its own application programs, and functions to store a document file or load a stored document file.

In this embodiment, the application program unit 510 is described, for the convenience of explanation and understanding, to illustrate a documentor for word-processing and a document file corresponding thereto. However, the application program unit 510 may include a variety of application programs, such as an image program for editing and generating the image file and an application program for generating the printing data (for example, data converted from the image file) transmitted to the image forming apparatus 600 from the information processing device 500.

If a print command is inputted with respect to the document file generated in or loaded from the application program unit 510, a GDI (graphic device interface) program (not shown) figures out a font, bitmap and vector information for letters and graphics of the document file, converts them into a function recognizable in the driver 520, and transmits the function to the driver 520.

The driver 520 receives the function for the document file and converts the document file into the printing data recognizable in the image forming apparatus 600. The printing data is generated through a language such as PCL or PS. In particular, the driver 520 provides a menu (for example, in the form of a pop-up window) for a user to be able to select various options for printing, such as a format conversion function of printing a data file. The option selected from the menu by the user is transferred to the controller 530 using the driver 520.

Here, the menu window for selecting the print options, which is provided in the driver 520, includes items for selecting a format conversion function of printing file. That is, it provides a lower-level menu to select detailed items, for example, as to an image file format into which the file is converted, as to whether the converted image file is to be transmitted to the information processing device 500, or as to whether the converted file is to be transmitted to one or more other external devices.

The controller 530 controls an operation of the information-processing device 500 according to a drive program stored in the storage unit 550, which will be described hereafter. For example, the controller 530 controls the application program unit 510 to generate the document file, and, if the print command is inputted for the generated document file, controls the driver 520 to provide the menu for selecting the printing options, to generate the printing data according to a selected option, and to transmit the generated printing data to the image forming apparatus 600 through the network interface card 540.

In particular, the controller 530 generates printing information for the printing data according to the printing option inputted through the driver 520, and transmits to the image forming apparatus 500 the generated printing information together with the printing data.

The network interface card 540 connects the information processing device 500 to a network such as LAN and Internet, and includes an I/O interface unit (not shown). The network interface card 540 is configured so as to be connected to the image forming apparatus 600, so that it performs a data communication between the information processing device 500 and the image forming apparatus 600, and transmits the printing data to the information processing apparatus 500 and receives an image file converted in the image forming apparatus 600.

The storage unit 550 is provided with a non-volatile memory device, such as a ROM (not shown), and a volatile memory device, such as a RAM (not shown). The ROM (not shown) stores various programs required for carrying out functions of the information processing device 500, and the RAM (not shown) temporarily stores data associated with the program execution of the controller 530. In addition, according to another embodiment of the general inventive concept, the storage unit 550 temporarily stores the printing data generated by the driver 520 in the RAM (not shown), and stores in the ROM (not shown) the converted image file transmitted from the image forming apparatus 600.

The image forming apparatus 600 includes an interface 610, a panel operation unit (OPE) 620, a printer engine 630, a memory 640, a controller 650, and a graphic processor 660. FIG. 6 illustrates function blocks related to the format conversion function of a printing data file, and other function blocks are omitted for the convenience of description. The interface 610 interfaces between the controller 650 and the information processing device 550, such as a personal computer or an external memory device, so as to receive data applied from the information processing device 500 and to transmit data from the image forming apparatus 600 to the information processing apparatus 500 or the external memory device.

The panel operation unit (OPE) 620 is provided with an input device (not shown) having a plurality of number keys and function keys. A control signal generated through user's key operation is applied to the controller 650. In addition, the panel operation unit (OPE) 620 is provided with an LCD (not shown) to display an operation state of the image forming apparatus 600.

The printer engine 630 functions to print data stored in the memory 640 according to the print command, which is inputted through control of the controller 650, or print data transmitted from the information processing device 500.

The memory 640 includes a non-volatile memory to store various control programs to operate the image forming apparatus 600 having the format converting function of printing data file, and a volatile memory to store data generated during an operation of the image forming apparatus 600 and detailed information on the data. For example, the volatile memory temporarily stores printing data received from the information processing device 500 through the interface 610, and temporarily stores an image file generated through the file-format conversion function. The non-volatile memory stores various programs required for an operation of the graphic processor 660.

The controller 650 controls the image forming apparatus 600 according to a drive program stored in the memory 640. According to the printing data and the printing information received from the information processing device 500, the controller 650 checks as to whether the format of the received printing data is to be converted, as to whether a printing operation is to be executed, as to the printing data to be converted, and as to the format of the image file, and then controls the graphic processor 660 to convert the image file into a file of designated format.

Figure 7:
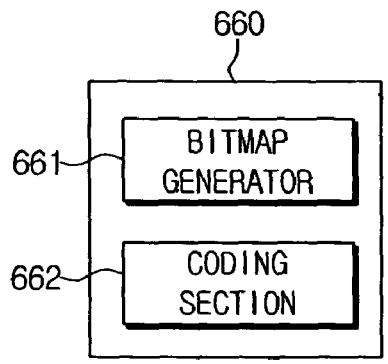
FIG. 7 is a block diagram illustrating a graphic processor of the image forming apparatus of FIG. 6.

FIG. 7 is a block diagram illustrating the graphic processor 660 of FIG. 6.

The image file format indicates a type of a file, which stores an image. The file can reduce or expand an image volume thereof, depending on a compression and storage mode, and thus the file format is converted accordingly. Examples for the image file format include BMP (bitmap) format, TIFF (tag image file format), PDF (portable document format), or the like. The above file formats are generated according to the format specified in each specification, based on a raw file generated by a bitmap mode, and identified by its compression mode and header.

The graphic processor 660 generates a bitmap file, which is raw data of a bitmap system, according to a control of the controller 650, and generates an image file of a designated format (target format) using the generated bitmap file. Referring to FIG. 7, the graphic processor 660 includes a bitmap generator 661 and a coding section 663.

The bitmap generator 661 generates a display list for the printing data, and renders the display list and generates bitmap data for printing, using a graphic engine unit (GEU) (not shown), which is constituted generally of an application-specified integrated circuit (ASIC). The bitmap data for printing is consisted of a 2-bit code of '0' and '1,' which is a typical data format generated in the image forming apparatus 600 in order to perform various image processing for printing.

The coding section 662 generates the image file according to the target format input from the controller 650, using bitmap data of the bitmap file generated in the bitmap generator 661.

According to the control signal input from the controller 650, the coding section 662 performs an encoding operation for the bitmap data to thereby generate the image file of the target format, using a program corresponding to the format of the image file to be converted, which is stored in the non volatile memory of the memory 640.

The format of the image file includes, for example, the TIFF and the PDF. The controller 650 controls the encoding section 662 to perform the encoding operation for uncompressed bitmap data and to generate the image file of the target format.

The TIFF file is formed of an image file header (IFH), an image file directory (IFD), and an image data section. The TIFF retains image data of a bitmap mode, and may use a compression technology, such as LZW (Lempel Ziv Welch), in order to reduce a data volume. In the TIFF file, the image file header includes first 8 bytes of the TIFF file, but a position of the image file directory (IFD) and the image data section is not fixed.

On the other hand, the PDF file is generated from raw data of the bitmap system using the compression technology, such as LZW, JPEG point photographic exerts group), or the like. The PDF file includes a header section, a body section, a cross-reference table (Xref), and a trailer. Here, the body section includes data for all objects, such as font, image, bookmark, and the like. The header section represents the type of a PDF file, and the trailer includes a point for the Xref table and a pointer for a key object contained in the trailer directory. In addition, the Xref table includes a pointer for all the objects contained in the PDF file.

As described above, the TIFF and PDF formats are illustrated, but the present general inventive concept may be applied generally to other image file formats, which can be generated using the bitmap data. For this purpose, an encoding program required for generating a file of the target format using the bitmap data may be beforehand stored in the non-volatile memory of the memory 640 of the image forming apparatus 600.

Figure 8:
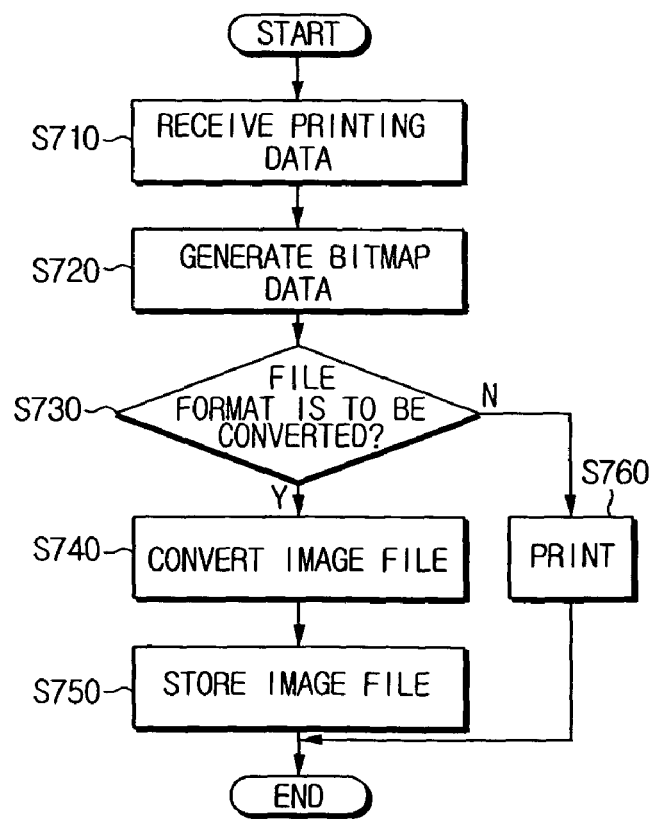
FIG. 8 is a flow chart illustrating a file converting operation of the image forming apparatus of FIG. 6.

FIG. 8 is a flow chart illustrating a file converting operation of the image forming apparatus 600 of FIG. 6.

Referring to FIGS. 6 through 8, using the application program unit 510 of the information-processing device 500, a user generates a document file or loads the document file stored in the storage unit 550. Through the driver 520, then, the user selects various printing options, such as the file-format conversion function, and inputs the print command to generate the printing data. The printing option includes, for example, whether the file format of the printing data is to be converted, the format into which the file is converted, whether the converted file is to be transmitted to the information processing apparatus 500 or other external devices.

Thereafter, the controller 530 of the information processing device 500 transmits the printing information, such as the printing data, and the selected printing options to the image forming apparatus 600 through the network interface card 540.

If the printing data and the printing information therefor, which are transmitted through the interface 610, are received (S710), the controller 650 of the image forming apparatus 600 analyzes the printing information to confirm whether the file-format conversion function is to be performed on the received printing data, whether the received printing data is to be printed, whether the printing data is converted, the format of the image file, and the like. Then, the controller 650 controls the graphic processor 660 to generate a display list for the printing data and a bitmap file using the display list (S720).

Then, depending upon whether the file format of the printing data is to be converted (S730), if the printing data is to be converted into an target format, the controller 650 controls the coding section 662 of the graphic processor 660 to encode the bitmap data and generate the image file, by activating a program of the memory 640 required for encoding the bitmap data according to the target format (S740).

In addition, the controller 650 temporarily stores the generated image file in the volatile memory of the memory 640, and then, depending upon the analyzed printing information, the generated image file is transmitted through the interface 610 to the information processing device 500 or an external device such as a memory stick (S750).

On the other hand, in a case where the file format conversion is not selected, the controller 650 transmits the generated bitmap data to the printer engine 630 and prints the data on a print paper after various image processing operations (S760).

As described above, according to this embodiment of the general inventive concept, the printing data transmitted from the information-processing device 500 is converted into the bitmap data for printing, and then converted into the image file of the designated target format. The image file may be transmitted back to the information-processing device or to an external memory device to store.

Furthermore, the format of the image file can be converted, or various document files (not image files) can be converted into the desired format of the image file, without necessity of purchasing or installing a separate application program.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus having a file-format conversion function of performing a data communication with a plurality of external memory devices, the apparatus comprising:

an interface unit to receive a first file with information on the first file from one of a plurality of external memory devices and to transmit a second file to at least one of the plurality of external memory devices according to the information on the first file;

a file converter to convert the first file from a first format into a second format as the second file according to the information on the first file and information on the second file; and a panel operation unit to display a file name list of the files and a format to be converted and to input a format conversion command for the first file, wherein the file converter converts the first file into the second file using information recorded in a head section of the first file, wherein the file converter, which comprises a plurality of coding sections to perform a format conversion on files having different formats, selects one of the plurality of coding sections according to the file name and the format to be converted input from the panel operation unit, and performs the format conversion, and wherein the interface unit transmits the format-converted first file to at least one of the plurality of external memory devices as the second file.

2. The image forming apparatus as clamed in claim 1, wherein the file converter comprises:

at least one coding section to encode or decode the first file to convert the format of the first file according to the information.

3. The image forming apparatus as claimed in claim 2, wherein the file converter selectively operates the at least one coding section according to the first format and the second format.

4. The image forming apparatus as claimed in claim 1, wherein the information comprises the file name list having files stored in the one of the plurality of external memory devices, and the first file is one of the stored files.

5. The image forming apparatus as claimed in claim 1, wherein, if a file name corresponding to the first file, and the second format are input through the panel operation unit, the file converter converts the first file of the file name into the second file in the second format.

6. The image forming apparatus as claimed in claim 1, wherein the one of the plurality of external memory devices comprises one of a USB memory device having a USB connection terminal and a memory card.

7. The image forming apparatus as claimed in claim 1, wherein the first format and the second format are one of a BMP (bitmap) format, a TIFF (tag image file format), and a PDF (portable document format).

8. The image forming apparatus as claimed in claim 1, wherein the plurality of memory devices are externally connectable to the interface unit, and the interface unit receives the first file from one of the plurality of memory devices and transmits the second file to the one or the other one of the plurality of memory devices.

9. The image forming apparatus as claimed in claim 8, wherein the file converter converts a format of the first file transmitted from the one of the plurality of memory devices, and the interface unit transmits the format-converted first file to the one or the other one of the plurality of memory devices as the second file.

10. A method of converting a file format in an image forming apparatus, which perform a data communication with an external memory device, the method comprising:

receiving one or more files stored in one of a plurality of external memory devices with information on the one or more files;

selecting one of the one or more files whose format is to be converted;

converting a format of the selected file from a first format into a second format according to information on the selected file;

transmitting the selected file converted into the second format to at least one of the plurality of external memory devices according to the information on the file, wherein the selecting comprises displaying a file name list of the files and a format to be converted and to input a format conversion command for the first file, wherein the converting comprises converting the first file into the second file using information recorded in a head section of the first file, wherein the converting performs a format conversion on files having different formats by a plurality of coding sections, selects one of the plurality of coding sections according to the file name and the format to be converted input from the panel operation unit, and performs the format conversion, and wherein the format-converted first file is transmitted to at least one of the plurality of external memory devices as the second file.

11. The method as claimed in claim 10, wherein the converting of the format of the selected file comprises performing an encoding and decoding operation to convert the format of the selected file according to information on the selected file and the first and second formats.

12. The method as claimed in claim 10, wherein the information comprises a file name list of the one or more files stored in the external memory device.

13. The method as claimed in claim 12, further comprising:
displaying the file name list of the one or more files;
designating a file name corresponding to the selected file from the file name list; and
inputting a format conversion command for the selected file.

14. The method as claimed in claim 13, wherein the inputting of the format conversion command comprises:
designating the second format.

15. The method as claimed in claim 10, wherein the plurality of memory devices are externally connectable to the image forming apparatus, and the receiving of the one or more files comprises receiving the selected file and the information on the file from one of the plurality of memory devices.

16. The method as claimed in claim 15, wherein the transmitting of the selected file comprises transmitting the file converted into the second format to one of the one or the other one of the plurality of memory devices.

17. The method as claimed in claim 10, further comprising:
printing the file converted into the second format onto a print paper.

18. The method as claimed in claim 17, further comprising:
selecting one of the transmitting of the file and the printing of the file.

19. The method as claimed in claim 10, wherein the first format and the second format are one of a BMP (bitmap) format, a TIFF (tag image file format), and a PDF (portable document format).

20. An image forming apparatus having a file-format conversion function of performing a data communication with a plurality of external memory devices, the apparatus comprising:
a connection terminal connectable to the plurality of external devices to receive a first file having a first format with information on the first file from one of the plurality of external devices;
a file converter to convert the first file having the first format into a second file having a second format;
a controller to transmit the second file having the second format to at least one of the plurality of external devices through the connection terminal according to the information on the first file; and
a panel operation unit to display a file name list of the files and a format to be converted and to input a format conversion command for the first file, wherein the file converter converts the first file into the second file using information recorded in a head section of the first file, wherein the file converter, which comprises a plurality of coding sections to perform a format conversion on files having different formats, selects one of the plurality of coding sections according to the file name and the format to be converted input from the panel operation unit, and performs the format conversion, and wherein the controller transmits the format-converted first file through the connection terminal to at least one of the plurality of external devices as the second file.

21. The apparatus as claimed in claim 20, wherein:
the first file comprises a first header and a first body section having first image data;
the second file comprises a second header and a second body having second image data; and
the file converter converts the first image data into the second image data and creates the second header according to the second image data to form the second file.

22. The apparatus as claimed in claim 20, wherein:
the first file comprises a first header and a first body section having first image data;
the second file comprises a second header and a second body having second image data; and
the file converter converts the first image data into raw image data, converts the raw image data into the second image data, and creates the second header according to the second image data to form the second file.

23. The apparatus as claimed in claim 22, wherein the raw image data comprises bitmap image data.

24. The apparatus as claimed in claim 20, wherein:
the first file comprises printing data;
the second file comprises image data and a header; and
the file converter converts the printing data into the image data, and creates the header according to the image data to form the second file.

25. The apparatus as claimed in claim 24, further comprising:
a printing unit to print the printing data.

26. The apparatus as claimed in claim 20, further comprising:
a printing unit to print at least one of the first file and the second file.

27. The apparatus as claimed in claim 20, further comprising:
an input unit through which the second format is input to the controller,
wherein the controller controls the file converter to convert the first file into the second file according to the received second format.

28. The apparatus as claimed in claim 20, further comprising:
a read-out card device connectable between the connection terminal and the plurality of external devices to interface transmission of the first and second file between the connection terminal and the plurality of external devices.

29. The apparatus as claimed in claim 20, wherein:

the plurality of external devices are connectable to the connection terminal through a network;

the connection terminal receives the first file from one of the plurality of external devices; and the controller transmits the second file having the second format to at least one of the plurality of external devices through the connection terminal.

30. The apparatus as claimed in claim 20, wherein the controller controls at least one of the plurality of external devices to store the second file.

31. The apparatus as claimed in claim 20, wherein the controller controls the one of the plurality of external devices to replace the first file with the second file.

* * * * *